United States Patent Office 2,869,567
Patented Jan. 20, 1959

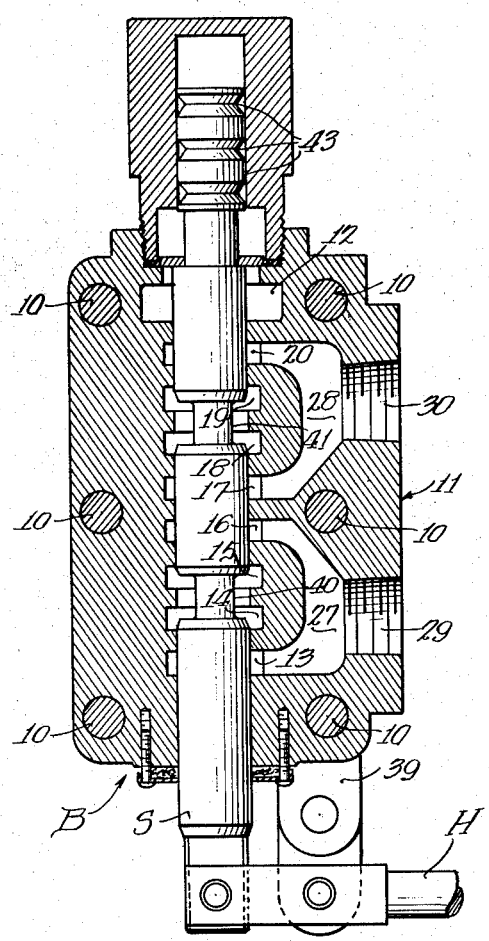

2,869,567

FLOW CONTROLLER UNIT FOR STACK VALVE

Floyd E. Carlson, Rockford, Ill., assignor to Sundstrand Machine Tool Co., a corporation of Illinois Application February 13, 1956, Serial No. 564,931

4 Claims. (Cl. 137—117)

This invention relates to a flow controller unit adapted for use in a fluid control system and more particularly to a unit adapted to communicate with an upstream source of fluid under pressure and having a main passage therethrough and means effective to regulate the flow of fluid through the main passage to provide a reduced constant volume of fluid downstream of the unit as compared to the volume delivered to the unit from the source.

It is a general object of the invention to provide a new and improved flow controller unit of the character described.

In the mobile equipment field particularly, multiple unit valve stacks are frequently employed where it is desirable to control two or more hydraulic cylinders or motors from a single control. In applications of the type described, it frequently occurs that the volume of hydraulic fluid required at some of the valve units and the associated motors is less than that required at other valve units and their associated motors for the reason, for example, that it may be desirable to operate some of the motors at a lesser speed than others. In the past, the practice has been to provide separate multiple unit valve stacks supplied from separate pumps which delivered the desired volume of fluid to each of the valve stacks.

It is a more specific object of the present invention to provide a flow divider section which may be mounted between any two adjacent valve units for the purpose of dividing the flow through the section to deliver a constant, but adjustable volume of fluid to the valve units located downstream therefrom thus permitting delivery of different volumes of fluid to different valve units in a single valve stack by means of a single pump.

Another object of the invention is to provide a new and improved flow controller unit including a valve body having a bore formed therein, an inlet port and an outlet port leading from the exterior of the valve body to the bore, means in the bore forming a restricted passageway connecting the inlet and outlet ports, a bypass leading from the bore to the exterior of the valve body, a valve member in the bore for controlling communication between the bore and the bypass, a passage connecting the outlet port and the bore for supplying fluid urging the valve member to a position blocking communication between the bore and the bypass, and passage means connecting the inlet port and the bore for supplying fluid urging the valve member to positions establishing communication between the bore and the bypass and, when the valve is in the latter positions, establishing communication between the inlet port and bypass for diverting fluid from the inlet port to control the volume of flow through the outlet port.

Other objects and advantages will become readily apparent from the following detailed description taken in connection with the accompanying drawings, in which:

Fig. 2 is a sectional view through one of the valve units, taken on the line 2—2 of Fig. 1; and Fig. 3 is an elevational view of the flow controller unit of this invention, taken on the line 3—3 of Fig. 1.

Figure 1:
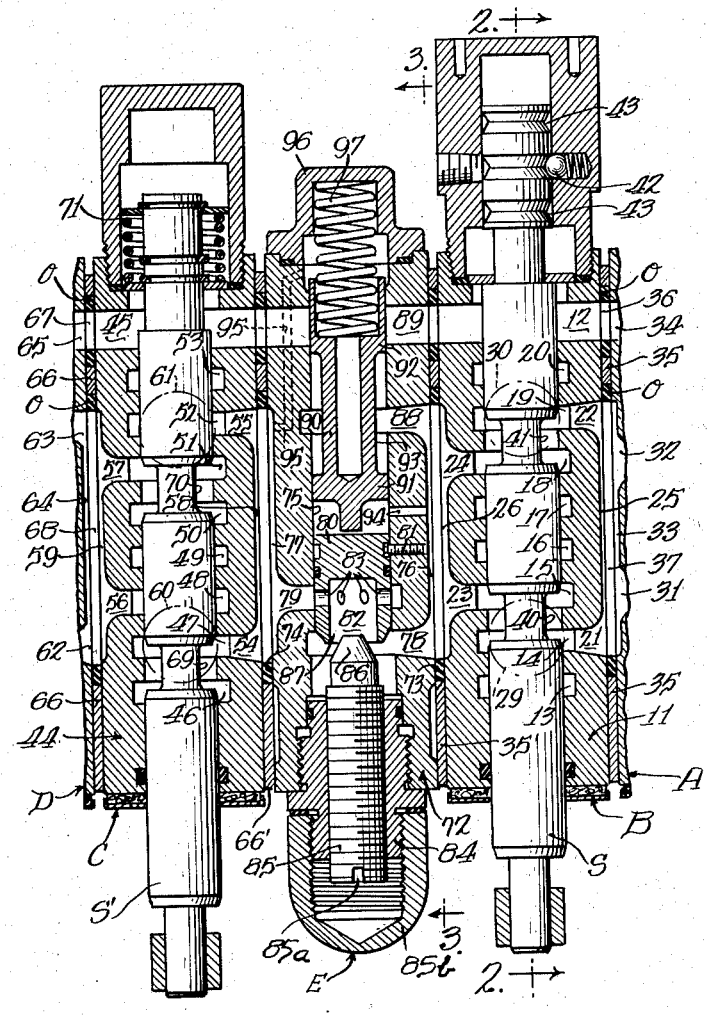
Fig. 1 is a fragmentary sectional view through a multiple unit valve stack embodying a typical arrangement of valve units and incorporating my new and improved flow controller unit.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring to Fig. 1, the invention is illustrated in connection with a multiple unit valve stack which, as shown here, may include valve units A, B, C, and D and a flow controller unit E embodying the principles of my invention. The valve units A, B, C, and D are all interchangeable and are of particular use in the mobile equipment field where it is often desirable to control two or more hydraulic cylinders or motors from a single control station. Any number of the valve units may be fastened together to perform any desired sequence of operation. Typical applications include road graders, bulldozers, snow plows, lift trucks, and the like. A typical circuit would include a pump, a tank, a multiple unit valve stack such as that illustrated, a relief valve in the line or built into the stack valve, and suitable cylinders or hydraulic motors. The valves may be utilized to control either single acting or double acting motors.

The multiple unit valve stack would usually include an inlet housing (not shown) mounted at the right of the valve units as viewed in Fig. 1, and an outlet housing (not shown) to the left of the valve units as viewed in Fig. 1. The inlet and outlet housings, the valve units A, B, C, and D, and the flow controller section E are arranged in side-by-side relationship and may be held together by means such as bolts 10 (Figs. 2 and 3). The inlet housing (not shown) may include a chamber communicating with the inlet to the adjacent valve unit and adapted to be connected with a source of fluid under pressure. Excessive pressures in the inlet housing may be relieved by a relief valve provided therein adapted to conduct overflow to bypassageways extending through the valve units. The outlet housing (not shown) may include a chamber for receiving fluid from the bypassageways and from the main outlet in the adjacent valve unit for return to tank.

As described more fully in the copending application of Louis A. Dolan, filed August 26, 1954, as Serial No. 452,311, the valve unit B includes a housing 11 having a bypassageway 12 extending transversely therethrough and a longitudinally extending valve bore formed with axially spaced annular grooves indicated by the reference numerals 13, 14, 15, 16, 17, 18, 19 and 20. The housing also includes inlet passages 21 and 22 (at the right as viewed in Fig. 1) which intersect the bore at grooves 14 and 19 respectively, and outlet passages 23 and 24 (at the left as viewed in Fig. 1) which intersect the bore at grooves 15 and 18 respectively. Inlet passages 21 and 22 merge near the inlet face of the valve housing to form a single large inlet passageway 25 and outlet passages 23 and 24 merge into a similar large outlet passageway 26 near the outlet face of the housing. The inlet and outlet passages and passageways in the housing define with the bore therein a continuous main flow path through the valve housing.

Referring to Fig. 2, grooves 13 and 16 are connected by a feed passageway 27 which is completely within the housing, and grooves 17 and 20 are connected by a similar feed passageway 28. Motor ports 29 and 30 intersect the passageways 27 and 28 respectively.

The valve unit A mounted to the right of valve unit B, as viewed in Fig. 1, may be similar in all respects to the valve unit B, and as shown includes a housing having outlet passages 31 and 32 which merge near the outlet face of the housing into a single large outlet passageway 33. The outlet passageway 33 in valve unit A and the inlet passageway 25 in valve unit B are of similar size and shape and in register so as to define a single passageway connecting the two units. The housing of valve unit A also includes a bypassageway 34 in register with the bypassageway 12 in the valve unit B.

The multiple unit valve stack may include a separator plate 35 mounted between the adjacent units A and B and having an opening 36 in register with the bypassageways 12 and 34 and a larger opening 37 in register with the inlet and outlet passageways 33 and 25. The openings 36 and 37 in the separator plate 35 are slightly oversize so that each may accommodate a ring-shaped gasket or seal member designated "O" which provides a sealed joint between adjacent housings. The separator plate 35 includes an apertured ear 39 (Fig. 2) extending downwardly beyond the adjacent valve housings to afford a mounting support for a valve stem operating handle H associated with the adjacent valve unit B.

Each of the valve units includes a valve stem slidably mounted in the bore extending through the housing. The valve stem in the unit A is not shown; the valve stem in the unit B is designated S and includes two stem grooves 40 and 41. The stem S has three operative positions and may be retained in any of these positions by a spring pressed ball 42 adapted to fit in any of three grooves 43. The valve stem in unit A may be identical.

In operation, assuming that the valve stem S is in a neutral center position, as illustrated in the unit B, oil enters the inlet passages 21 and 22, into grooves 14 and 19, through the stem grooves 40 and 41, thence to the grooves 15 and 18 and out through outlet passages 23 and 24. From the passages 23 and 24, oil flows into the large passageway 26 and from there to the downstream valve units, or, as illustrated, to the flow controller unit E. In this position of the valve stem, both motor ports are blocked so as to "hold" any load imposed on the motor. Other positions of the valve stem will be described with reference to valve unit C.

The valve unit C may be identical in all respects with the valve unit B described above. For this reason no sectional view similar to that of Fig. 2 showing unit B has been provided. As shown, unit C includes a housing 44 having a bypassageway 45 extending transversely therethrough and a longitudinally extending valve bore formed with axially spaced annular grooves indicated by the reference numerals 46, 47, 48, 49, 50, 51, 52 and 53. The housing also includes inlet passages 54 and 55 (at the right of the unit, as viewed in Fig. 1) which intersect the bore at grooves 47 and 52, respectively, and outlet passages 56 and 57 (at the left of the unit, as viewed in Fig. 1) which intersect the bore at grooves 48 and 51, respectively. Inlet passages 54 and 55 merge near the inlet face of the valve housing to form a single, large inlet passageway 58, and outlet passages 56 and 57 merge into a similar large outlet passageway 59 near the outlet face of the housing. The inlet and outlet passages and passageways in the housing define with the bore therein a continuous main flow path through the valve housing.

As in the valve unit B, grooves 46 and 49 are connected by a feed passageway (not shown) similar to the feed passageway 27 in the valve unit B and which connects with a motor port indicated in broken line at 60. Grooves 50 and 53 are connected by a like feed passageway (not shown) similar to the feed passageway 28 in the valve unit B and which connects with a motor port indicated in broken line at 61.

The valve unit D mounted to the left of the valve unit C, as viewed in Fig. 1, may be similar in all respects to the valve unit C, and as shown includes a housing having inlet passages 62 and 63 which merge near the inlet face of the housing to form a single, large inlet passageway 64. The outlet passageway 59 in the valve unit C and the inlet passageway 64 in the valve unit D are of similar size and shape and in register so as to define a single passageway connecting the two units. The housing of valve unit D also includes bypassageway 65 in register with the bypassageway 45 in the valve unit C.

The multiple unit valve stack may include a separator plate 66 (similar to the plate 35 previously described) mounted between the adjacent units C and D and having an opening 67 in register with the bypassageways 45 and 65 and a larger opening 68 in register with the outlet and inlet passageways 59 and 64. The openings 67 and 68 in the separator plate 66 are slightly oversize so that each may accommodate a ring-shaped gasket or seal member designated "O" which provides a sealed joint between adjacent valve housings. As with the separator plate 35, the separator plate 66 may also include an apertured ear similar to that shown at 39 extending downwardly beyond the adjacent valve housings to afford a mounting support for a valve stem operating handle associated with an adjacent valve unit.

The valve stem in the unit D is not shown; the valve stem in the unit C is designated S' and includes stem grooves 69 and 70. The stem S' also has three operative positions and may be controlled if desired as the valve stem S in the unit B. However, as shown, the valve stem S' is biased to a neutral, center position by a spring 71 and may be moved upwardly or downwardly from the central position to its two other operative positions. In the neutral position, the valve stem S' functions as the valve stem S described in the unit B.

In operation, if the steam S' is moved downwardly from the neutral center to the position illustrated in the unit C, oil entering the groove 52 from the inlet passage 55 is blocked, forcing the total flow of oil through inlet passage 54 and to groove 47. Groove 69 in the stem connects the grooves 47 and 46 in the bore so that oil flows from groove 47 to groove 46, thence into the feed passageway (not shown) to motor port 60 and to either a cylinder or a motor. Groove 49, which is connected to groove 46 by the feed passageway (not shown) is blocked by the stem. Oil returning from the cylinder or motor enters port 61, flows into the second feed passageway (not shown) and into grooves 50 and 53. Groove 53 is blocked by the stem. Groove 50 is connected to groove 51 by stem groove 70, allowing oil to flow from the groove 50 to groove 51, into outlet passageway 57 and from there to passageway 59. Thus, oil returned from the motor associated with the valve unit C may be utilized for actuating downstream motors.

If the valve stem S' is moved upwardly from the neutral center position, the operation described immediately above is reversed, so that oil entering the inlet passage 54 is blocked and oil entering the inlet passage 55 is delivered to the motor port 61. The motor port 60 is conencted to the outlet passage 56.

While the valve units illustrated have been described as controlling double-acting cylinders, it should be understood that with slight modification to the valve housing, the valve unit may be adapted for controlling a single acting motor, or with the substitution of a modified stem, a fourth or "float" position of the valve stem is enabled, permitting connection of both motor ports to pressure fluid and exhaust so that the load is allowed to float, all as described more fully in the copending application referred to above.

The flow controller unit E may comprise a cast valve body 72 having opposed flat exterior surfaces 73 and 74 adapted to fit in abutting relationship between any two adjacent valve units, which, as shown, are valve units B and C, or to fit in abutting relationship with separator plates 35' and 66', similar to plates 35 and 66 previously described. The valve body 72 is formed with a longitudinal bore 75 extending therethrough, and with an inlet chamber 76 formed in the inlet face 73 of the valve body, and an outlet chamber 77 formed in the outlet face 74 of the valve body. An inlet port 78 leads from the inlet chamber 76 to the valve bore 75, and an outlet port 79 leads from the valve bore to the outlet chamber 77. The inlet chamber 76 and the outlet chamber 77 are fashioned in a manner similar to the inlet and outlet passageways 26 and 58 of the adjacent valve units so as to be in register therewith and co-extensive therewith.

Means are provided in the valve bore 75 for defining an isolated passageway connecting the inlet and outlet ports and including an adjustable orifice effective to restrict the flow of fluid through the passage. As seen in Fig. 1, this means includes a cylindrically shaped, skirted plug 80 which is fitted in the bore 75 and retained therein by means of a set screw 81 which engages a groove formed externally on the plug 80. The plug 80 is retained in the bore 75 in a position such that the open end or mouth of a bore 82 in the skirted end of the plug is positioned to communicate with the inlet port 78, and so that radially drilled ports 83 leading from the bore 82 are positioned centrally within the outlet port 79. The lower end of the valve bore 75, as viewed in Fig. 1, is closed by a tubular member 84 which is threaded into the bore and carries a needle valve member 85 coaxial with the plug bore 82 and having a conically shaped end portion 86 adapted to be received in the open end of the bore 82. The lower end of the needle valve member is formed with a transverse slot 85a which permits adjustment of the member 85 so that the conical end portion 86 forms with the plug 80 and bore 82 an adjustable orifice 87 which functions to restrict the flow of fluid through the valve body and is effective, in response to fluid flow, to create a pressure differential between fluid in the inlet chamber 76 and fluid in the outlet chamber 77. A cover member 85b screws onto the tubular member 84 so as to enclose the outer end of the adjustable valve member 85.

In order to divert fluid from the inlet chamber 76 and control the flow through the orifice 87, a flow divider passage 88 leads from the inlet chamber to the bore 75, and the valve body 72 is formed with a bypass 89 which leads from the inlet face 73 through the valve body to the outlet face 74 intersecting the bore 75. The bypass 89 is positioned so that it registers with the bypassageways 12 and 45 in the adjacent valve units B and C. In order to control communication between the flow divider passage 88 and the bypass 89, a valve member 90 is slidably mounted in the bore 75. The valve member 90 is formed with separated lands 91 and 92 having a reduced portion therebetween forming a groove 93. The position of the valve member 90 and the configuration of the groove 93 are such that the flow divider passage 88 communicates with the groove 93 in all positions of the valve member 90.

The pressure differential across the orifice 87 between fluid in the inlet chamber 76 and the fluid in outlet chamber 77 is sensed, and this pressure differential is utilized in controlling the valve member 90 so as to control communication between the flow divider passage 88 and the bypass 89. In this manner the pressure differential between fluid in the inlet chamber and fluid in the outlet chamber is utilized to control the flow of fluid from the passage 88 to the passage 89, and thus to control the flow of fluid through the orifice 87. Accordingly, a sensing passage 94 leads from the inlet chamber 76 to the bore 75 so as to supply fluid under pressure from the inlet chamber against the lower end of the valve member 90, as viewed in Fig. 1, to urge the valve member toward positions wherein communication is establshed between the flow divider passage 88 and the bypass 89. Also, a sensing passage 95 leads from the outlet chamber 77 to the upper end of the bore 75 to supply fluid under pressure from the outlet chamber acting against the opposite end of the valve member 90 to urge it toward a position wherein communication between the flow divider passage 88 and the bypass 89 is blocked. A cover member 96 (Fig. 1) secured to the valve body 72 by means such as screws (not shown) closes the upper end of the valve bore 75 and forms a seat for a spring 97 which also bears against the valve member 90 so as to assist the pressure of fluid from the outlet chamber in urging the valve member toward a position blocking communication between the passage 88 and the bypass 89.

In operation, fluid from the outlet passageway 26 of the upstream valve unit B enters the inlet chamber 76 and passes through the adjustable orifice 87 and out through the outlet chamber 77 to the downstream valve unit C. The passage of fluid through the adjustable orifice 87 creates a pressure drop. The pressure differential thus created is sensed to control the position of the valve member 90 and becomes sufficient to move the valve member 90 upwardly, as viewed in Fig. 1. The areas of the valve member exposed to inlet and outlet pressures and the strength of the spring 97 are so correlated that the valve member 90 continues moving upwardly until equilibrium is reached between pressure differential and spring. Under normal conditions of flow to the inlet chamber 76, the position of the valve member 90, when equilibrium is obtained between the pressure differential and the spring 97, is such that a constant volume of fluid passes through the orifice 87 and some communication is permitted between the flow divider passage 88 and the bypass 89 so that a portion of the fluid entering the inlet chamber 76 is diverted through the bypass 89 and returned to tank instead of passing through the adjustable orifice 87 into the downstream valve unit C. If the differential pressure increases, such as will occur as a result of an increased flow through the orifice, the valve member 90 will move upwardly (as viewed in Fig. 1) to permit an increased flow to the bypass 89.

The total volume of flow through the orifice 87 may be adjusted by varying the size of the orifice 87 which may be accomplished by adjusting the needle valve member 85.

From the foregoing, it will be clear to those skilled in the art that the pressure differential across the orifice 87 is a function of the rate of flow therethrough. The orifice may be adjusted as previously described to provide for a predetermined flow, that is, to provide for a predetermined pressure differential thereacross when the desired flow is attained. Deviations in this pressure differential (which, of course, reflect deviations from desired flow) are utilized to position the bypass 90, thus reestablishing the desired pressure differential and flow conditions across the orifice. Thus, so long as at least the desired flow is delivered to the upstream side of the orifice, the flow to the downstream valve unit will be constant, regardless of the excesses of flow above that desired, and regardless of the working pressures, either downstream or upstream, of the orifice. Thus, the flow to the valve unit C will be constant, regardless of the position of the valve stem of the upstream valve unit B (or the amount of work being performed by fluid controlled by the valve), and without regard to the position of the valve stem S' on the downstream unit C.

It will now be apparent that I have provided a flow divider unit for use in a multiple unit valve stack which is effective to provide a reduced constant flow to valve units downstream therefrom as compared to the volume of flow to valve units upstream therefrom, and that I have accomplished this in a relatively simple and inexpensive manner by providing a cast valve body having a longitudinal bore in which all of the working parts of the divider unit are mounted.

One of the important features of the present invention is that it enables a single pump to do the work of several. In many situations, fluid motors are provided to perform various forms of work, but the volume requirements of the fluid motors often differ markedly. Thus, situations are often encountered where one fluid motor is designed to operate at, for example, ten gallons a minute, and a second fluid motor to operate at a higher volume, for example, thirty gallons per minute. In normal practice, it has been necessary to provide two pumps, one delivering fluid under pressure at the required volume for each motor.

According to the present invention, however, a single pump having a volumetric capacity equal to the demand of the motor with the highest volume would be used, and the flow divider of the present invention utilized, not only to reduce the flow to the unit requiring the lower volume, but also to deliver fluid to such unit at a constant volume or constant flow. Thus, all of the valves utilized to control the delivery of fluid under pressure to various motors may be arranged in the form of a single stack of the type described in said copending application of Dolan, and one or more of the flow dividers of the present invention interposed between units where reduced flow is required.

I claim:

1. In a multiple unit valve stack having a plurality of interchangeable valve units mounted in side-by-side relationship with each unit having a main flow path therethrough including an inlet at one side of the valve unit adapted to communicate with a source of fluid under pressure and an outlet at the opposite side of the valve unit with the inlets of succeeding units being in register with the outlets of preceding units, each of said valve units also having a separate bypassageway extending therethrough with the bypassageways in adjacent units being in register, in combination therewith a flow controller unit mounted between two adjacent valve units for delivering a reduced constant volume of fluid to the main flow path in valve units downstream therefrom comprising, a valve body having opposed sides fitting in abutting relationship between the adjacent valve units, a longitudinal bore formed in the valve body, an inlet chamber formed in one side of the valve body in register with the outlet from the preceding valve unit, an outlet chamber formed in the opposed side of the valve body in register with the inlet to the succeeding valve unit, an inlet port leading from the inlet chamber to said bore, an outlet port leading from said bore to the outlet chamber, means in the bore forming a passageway connecting the inlet and outlet ports and having an orifice restricting the flow of fluid through the valve body and creating a pressure drop between fluid in the inlet chamber and fluid in the outlet chamber, a flow divider passage leading from the inlet chamber to the bore to divert fluid from the inlet chamber, a bypass extending through the valve body from one of said opposed sides to the other and in register with the bypassageways in adjacent valve units, a valve member in said bore for controlling communication between said flow divider passage and said bypass, a sensing passage leading from the inlet chamber to said bore for supplying fluid urging said valve member to positions establishing communication between the flow divider passage and the bypass, and a sensing passage leading from the outlet chamber to the bore for supplying fluid urging the valve member to a position blocking communication between the flow divider passage and the by-pass, whereby the pressure differential across the valve body is sensed for controlling the position of the valve member so as to provide a predetermined constant volume of fluid to valve units located downstream from the flow controller unit which is less than the volume of flow from valve units located upstream from the flow controller unit.

2. In a multiple unit valve stack having a plurality of valve units arranged in side-by-side relationship with each unit having a main flow path therethrough in register with the main flow path in adjacent valve units to form a continuous path through the valve units, each of said valve units also having a separate bypassageway extending therethrough with the bypassageways in adjacent units being in register, in combination therewith, a flow controller section mounted between two adjacent valve units for delivering a reduced constant volume of fluid to the main flow path in the adjacent valve unit downstream therefrom which is less than the volume of fluid flowing to the controller section from the adjacent upstream valve unit, comprising, a valve body having a main passage in register with the main flow path in adjacent upstream and downstream valve units and provided with a restriction limiting the flow of fluid therethrough and creating a pressure differential between fluid upstream of the restriction and fluid downstream of the restriction, and valve means operating in response to said pressure differential for diverting a portion of the flow from the main passage in the valve body to the bypassageway in an adjacent valve unit so as to deliver a reduced constant volume of flow to the main flow path in the adjacent downstream valve unit.

3. A flow controller, for use between adjacent valve units in a multiple unit valve stack, comprising, a valve body having opposed, flat, exterior faces adapted to fit in abutting relationship between flat, exterior surfaces of adjacent valve units, said valve body having a longitudinal bore formed therethrough, an inlet chamber formed in one flat, exterior face of the valve body adapted to register with an outlet from an adjacent valve unit, an outlet chamber formed in the opposed exterior face of the valve body adapted to register with an inlet to an adjacent valve unit, an inlet port leading from the inlet chamber to said bore, an outlet port leading from said bore to the outlet chamber, means in the bore forming a main passageway connecting the inlet and outlet ports and having an adjustable orifice effective to restrict the flow of fluid through the valve body and creating a pressure drop between fluid in the inlet chamber and fluid in the outlet chamber, a bypass extending through said valve body from one flat, exterior face to the opposed exterior face, intersecting said bore at a position spaced from said main passageway and adapted to register with bypassages in adjacent valve units, a valve member slidable in said bore and having longitudinally spaced lands with a groove therebetween, spring means acting against one end of said valve member for urging the valve member toward a position wherein one of said lands blocks communication between said bore and said bypass, a passage leading from said outlet chamber to said bore for directing fluid from said outlet chamber against said one end of the valve member to assist said spring means in urging the valve member toward blocking position, a passage leading from said inlet chamber to said bore for directing fluid from the inlet chamber against the other end of the valve member to urge the valve member toward nonblocking positions wherein communication is permitted between said bore and said bypass through the groove in the valve member, and a flow divider passage leading from said inlet chamber to said bore intermediate said bypass and said main passageway to communicate with the groove in said valve member for conducting fluid from the inlet chamber to the bypass when the valve member is in nonblocking positions.

4. Apparatus for providing a substantially constant volume of fluid under pressure from an upstream unit to a downstream unit in a multiple unit stack valve wherein fluid is delivered to said upstream unit in excess of said volume, comprising: a control interposed between said downstream unit and said upstream unit and providing a passageway interconnecting the outlet of the upstream unit and the inlet of the downstream unit, an orifice in said passageway, a bypass passage, a valve movable to connect the outlet of said upstream unit with the bypass passage, means sensing the pressure differential in the passageway on opposite sides of the orifice, and means operating to position said valve in accordance with said pressure differential to maintain said differential constant and thereby to provide for a constant flow through the passageway to the inlet of said downstream unit.

References Cited in the file of this patent

UNITED STATES PATENTS

| | | |
|---|---|---|
| 2,238,768 | Berglund et al. | Apr. 15, 1941 |
| 2,247,140 | Twyman | June 24, 1941 |
| 2,486,087 | Wright | Oct. 25, 1949 |
| 2,656,846 | Anderson | Oct. 27, 1953 |
| 2,791,229 | Pasco | May 7, 1957 |